W. C. SMITH.
ELECTRIC HEATER AND HUMIDIFIER.
APPLICATION FILED MAY 16, 1914.
1,114,404.
Patented Oct. 20, 1914.
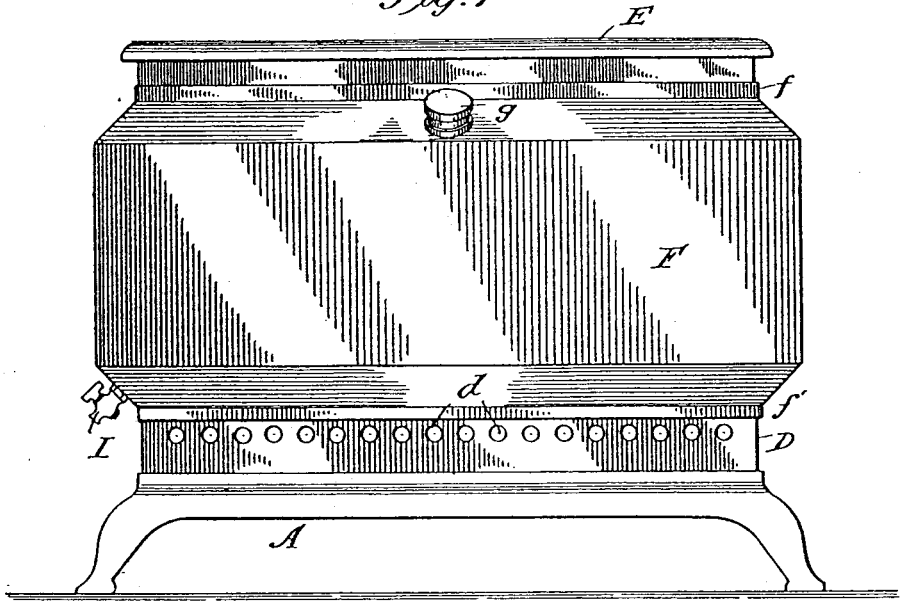
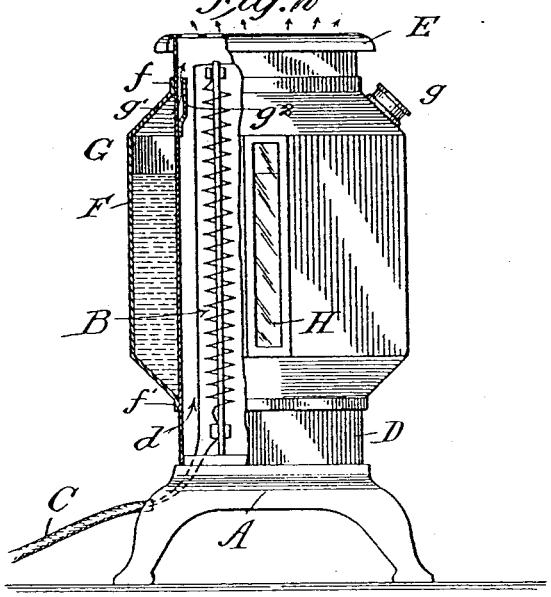
WITNESSES
INVENTOR
William Clay Smith
BY
ATTORNEYS

UNITED STATES PATENT OFFICE.

WILLIAM CLAY SMITH, OF TWIN FALLS, IDAHO, ASSIGNOR OF ONE-HALF TO HARRY A. BRIZEE, OF TWIN FALLS, IDAHO.

ELECTRIC HEATER AND HUMIDIFIER.

1,114,404.  Specification of Letters Patent.  Patented Oct. 20, 1914.

Application filed May 16, 1914. Serial No. 839,030.

*To all whom it may concern:*

Be it known that I, WILLIAM CLAY SMITH, a citizen of the United States, and a resident of Twin Falls, in the county of Twin Falls and State of Idaho, have invented a new and Improved Electric Heater and Humidifier, of which the following is a full, clear, and exact description.

This invention relates to electric heaters and relates more particularly to a combined heater and humidifier whereby vapor is generated by the heating elements of the heater and caused to mix with the heated air so as to temper the same and prevent the objectionable dryness of air heated by an ordinary electric heater.

The invention has for its general objects to provide a combined heater and humidifier which is of comparatively simple and inexpensive construction, reliable and efficient in use and so designed that it does not necessitate any changes in the standard construction of the electrical part of the device.

A further object of the invention is the provision of a casing for an electric heater which includes in its embodiment a water jacket so related to the coils or heating elements of the heater that the water is gradually vaporized and mixed with the heated air passing through the heater so as to give the proper humidity to the air of the room in which the apparatus is in use.

With such objects in view, and others which will appear as the description proceeds, the invention comprises various novel features of construction and arrangement of parts which will be set forth with particularity in the following description and claims appended hereto.

In the drawing, which illustrates one embodiment of the invention and wherein similar characters of reference indicate corresponding parts in both the views, Figure 1 is a side view of the combined heater and humidifier; and Fig. 2 is an end view with portions in section to illustrate the water jacket and its relation to the heating elements.

Referring to the drawing, A designates a base of any suitable design on which the electric heating elements in the form of coils or equivalent means B are suitably secured, the current being supplied by flexible cord C which is connected with the heating coils in the usual manner. A casing D made of sheet or other metal is positioned on the base A and is provided with a cap E having openings through which the heated air ascends. The casing D is a hollow box-like body which is bottomless and fits the raised portion $a$ of the base A, and any suitable means may be employed for securing the casing to the base. In the walls of the casing B and adjacent the bottom thereof are openings $d$ forming air inlet means whereby the air enters the casing and travels upwardly along the heating elements and escapes through the cap E.

The humidifying of the air is accomplished by surrounding the casing D with a jacket F which has its upper and lower portions $f$ and $f'$ connected with the exterior of the casing D by water and vapor-tight joints, whereby a water and vapor chamber G is provided entirely around the casing of the heater. Water is supplied to this chamber G through a filling opening that is normally closed by a cover or cap $g$, the level of the water being visible at all times through a gage glass H, and at the bottom of the water jacket at any desired point is a pet cock I for enabling the water to be drawn off. The upper part of the chamber G communicates with the interior of the casing D through openings or ports $g'$, and adjacent these openings are plates $g^2$ which serve to form guards to prevent water from passing out through the openings $g'$ and wetting the heating elements, as when the device is moved.

In operation the body of water surrounding the heating elements is brought to a high temperature so that vapor is generated. This vapor naturally rises and passes into the top of the casing D and mixes with the ascending air which is previously heated by passing along the heating elements, and as a consequence the vapor is mixed with the heated air and humidifies it so that it is in a more natural and beneficial state for breathing.

It will be seen that the jacket being made of sheet metal and placed around the exterior of the casing does not materially add to the cost or complication of the electric heater and humidifier and at the same time the article is of pleasing and attractive appearance and possesses the advantages hereinbefore referred to. Very little attention is required, as the filling of the humidifier every few days is sufficient. As the humidifier contains a body of water that entirely surrounds the casing there is an equal distribution of weight, so that the stability of the apparatus is in no way impaired. It is furthermore to be noted that the improvement resides entirely in the casing, which is so designed that it can be substituted for the casings of electric heaters in present use or of standard design.

Having thus described my invention, I claim as new and desire to secure by Letters Patent:

1. A combined electric heater and humidifier comprising a structure including heating elements, a casing mounted on the structure and surrounding the heating elements, said casing having means for permitting air to flow through the casing and be heated, and a water jacket surrounding the casing and having outlet means opening into the interior of the casing for delivering vapor to the heated air prior to the exit thereof from the casing.

2. A combined electric heater and humidifier comprising a structure including heating elements, a casing fitted to the structure and surrounding the heating elements, said casing having air admitting openings in its bottom and outlet means at its top, a jacket surrounding the casing and forming a water-containing chamber for generating vapor by heat from the element, and outlet means through which the chamber communicates with the upper part of the casing, whereby heated air passing through the latter draws the vapor from the said chamber and produces a humidifying of the heated air.

3. A combined heater and humidifier comprising a casing having cool air admitting means in its lower part and hot air outlet means at its upper part, electric heating means in the casing, a jacket surrounding the casing for containing water whereby vapor is produced by heat from the said elements, and communicating means between the upper part of the casing and the said chamber for permitting vapor to pass into the casing and mix with the heated air before the latter discharges from the casing.

4. A casing and humidifier for an electric heater, comprising an inner shell, an outer shell surrounding the inner shell and fastened thereto to form a water-containing chamber, a level gage connected with the chamber, a closed filling means for the upper part of the chamber, means of communication between the upper part of the chamber and the interior of the inner shell, and guards extending along the said last-mentioned means and arranged within the inner shell to prevent water from splashing out of the chamber and into the inner shell.

In testimony whereof I have signed my name to this specification in the presence of two subscribing witnesses.

WILLIAM CLAY SMITH.

Witnesses:
J. E. WHITE,
HARLEY N. BUTLER.